Patented Aug. 18, 1936

2,051,492

UNITED STATES PATENT OFFICE 2,051,492

METHOD OF PRODUCING HIGH VISCOSITY ARALKYL ETHERS OF CELLULOSE

Eugene J. Lorand, Wilmington, Del., assignor to Hercules Powder Company, Wilmington, Del., a corporation of Delaware No Drawing. Application May 11, 1934, Serial No. 725,079

20 Claims. (Cl. 260—152)

This invention relates to methods for the production of high viscosity aralkyl ethers of cellulose.

Aralkyl ethers of cellulose are produced, as is well known, by the interaction of alkali cellulose and an aralkyl halide, as, for example, benzyl chloride, phenylethyl chloride, etc. Since the concentration of free alkali in the reaction mass during the preparation of aralkyl ethers of cellulose continually decreases, it is essential to have initially a very high alkali concentration in the reaction mass if the reaction is to progress to completion without the addition of more alkali. Such high concentrations of alkali, however, tend to degrade the alkali cellulose and result in the production of an inferior quality of cellulose ether which possesses a low viscosity.

Accordingly, various processes of etherification have been devised in which the use of a high initial alkali concentration is avoided. Such methods include that involving repeated additions of fresh alkali to the reaction mass in quantities sufficient to maintain substantially constant the initial alkali concentration or, if desired, in quantities sufficient to gradually increase the alkali concentration throughout the course of the reaction, and that involving continuous removal of water from the reaction mass by distillation, the water being removed as an azeotropic mixture with the aralkyl halide or with an inert ingredient added for that purpose. However, while by these methods the degradation of the alkali cellulose is substantially diminished, nevertheless the cellulose ethers produced possess only relatively low viscosities. For example, various benzyl celluloses produced in accordance with the methods described above have a viscosity varying from 50–75 centipoises when measured in 8% concentration in a solvent composed of 80 parts by weight of toluene and 20 parts by weight of ethanol at 25° C.

It has been found that by the method in accordance with this invention it is possible to produce aralkyl ethers of cellulose having high viscosities, for example, of the order of 350 centipoises as measured by the method described above.

The method in accordance with this invention involves the continuous removal of water from the reaction mass as an azeotropic mixture with the aralkyl halide or with an inert substance added for that purpose and the repeated addition at periodic intervals to the reaction mass of alkali solutions of progressively increasing concentrations. Thus, for example, cellulose from a suitable source, such as purified cotton linters, purified wood pulp, etc., is first impregnated with an alkali solution having a relatively low concentration compared with that which is usually used for such purposes, with, for example, a solution having a concentration of from 18–22%. Desirably, but not necessarily, the cellulose used will be of a high viscosity grade. However, good results can be obtained with cellulose of medium viscosity. The cellulose so treated after being pressed in the usual manner so that a definite amount, about two or three times the dry weight of the cellulose, of alkali solution is retained is treated with an aralkyl halide, such as, for example, benzyl chloride, phenylethyl chloride, etc. and heated, in a suitable container equipped for agitation with a mechanical stirrer or by rotation of the container, to a temperature at which distillation begins, about 104–110° C. The apparatus may be equipped in the known manner to provide for the separation of the azeotropic mixture of water and aralkyl halide which distills over and for the return of the aralkyl halide to the reaction mass. If the temperature at which the azeotropic mixture of aralkyl halide and water distills is higher than is desirable for the etherification reaction, an inert substance, as, for example, toluene, xylene, etc., which will form a lower boiling azeotropic mixture with water, may be added to the reaction mass. When from 40–80%, as, for example, about 50% of the water present has distilled over from the reaction mass, fresh alkali solution of higher concentration than that originally used is added to the reaction mass and the distillation continued in the same manner. This procedure is repeated with the addition of fresh alkali solutions of increasing concentration until the fibres of the cellulosic mass have become completely dispersed. The reaction is then complete. Desirably the alkali solutions will be added in amounts such as to substantially restore the amount of water originally present.

The etherification reaction will last from 5–9 hours, depending upon the aralkyl halide or the inert substance, the type and speed of agitation, etc. The intervals at which it is necessary to add fresh alkali solution to the reaction mass are determined by the rate of distillation, which preferably will be somewhat slower during the latter stages of the reaction than at the start. The rate will desirably be such that addition of fresh alkali solution will be made at intervals ranging from about 45 minutes at the start of the reaction to about 2 hours at the end of the reaction. The fresh alkali solution will be added in amounts substantially equal to the quantity of water distilled off since the previous addition. The concentration of the fresh alkali solution to be added will be increased gradually by increments of 2–5% from the concentration of the solution initially used for impregnating the cellulose to a final concentration of about 33%. As the concentration approaches this limit the magnitude of the increments may be diminished.

The following example is illustrative of the method in accordance with this invention in its specific embodiment:

350 grams of purified cotton linters, preferably of a high viscosity grade, are impregnated with 2,600 cc. of 18% sodium hydroxide solution. After standing for from 30 minutes to an hour, the linters are pressed to a weight of 1,060 grams, and are shredded and fed into the etherification apparatus, which is equipped with a mechanical stirrer and with a condenser and receiver for distillation. 1,000 cc. of benzyl chloride are added and the apparatus is heated to a temperature at which distillation begins, that is about 105° C. The contents are then gently agitated and distillation is conducted for a period of 7½ hours. During this period additions of benzyl chloride and of fresh alkali solution of gradually increasing concentration are made at the intervals shown in the following table:

Table A

| Time | | Volume distillate | | Benzyl chloride added (cc.) | Fresh alkali sol. added | |
| --- | --- | --- | --- | --- | --- | --- |
| Hrs. | Mins. | Benzyl chloride (cc.) | Water (cc.) | | Amount (g.) | Conc. NaOH (%) |
| 0 | 0 | 0 | 0 | | 1000 | (710 in the original alkali cellulose.) |
| 0 | 30 | | | 500 | | |
| 0 | 45 | 160 | 260 | | 300 | 18 |
| 1 | 0 | | | 500 | | |
| 1 | 30 | 370 | 560 | 500 | 317 | 24 |
| 2 | 0 | | | 500 | | |
| 2 | 30 | 590 | 850 | 500 | 330 | 29 |
| 3 | 0 | | | 500 | | |
| 3 | 30 | 850 | 1150 | | 341 | 31.8 |
| 4 | 0 | | | 500 | | |
| 4 | 30 | 1060 | 1420 | | 341 | 31.8 |
| 5 | 0 | | | 500 | | |
| 6 | 15 | 1310 | 1740 | | 136.5 | 33 |
| 7 | 30 | 1450 | 1900 | | | |

During the reaction the temperature of the reaction mixture gradually rises to about 120° C. at the end; and as the reaction progresses and the mixture softens and liquefies, the rate of stirring is increased. At the completion of the reaction the benzyl cellulose produced is separated by one of the known processes and is purified by cold and warm extractions with organic solvents and with water in the known manner. The purified product has a viscosity of 350 centipoises as measured in an 8% solution in a solvent composed of 80 parts by weight of toluene and 20 parts by weight of ethanol at 25° C.

In the reaction described above, benzyl chloride was added to the reaction mass from time to time in quantities shown in Table A above to replace the benzyl chloride which distilled from the reaction mixture along with the water. It is preferable to conduct the reaction with apparatus equipped for the separation of the condensed aralkyl halide from the aqueous distillate and for the return of the former to the reaction mass. When the reaction is effected in apparatus so designed, it is not necessary to add additional aralkyl halide to the reaction mass during the course of the reaction. However, in this case a larger quantity of aralkyl halide than is indicated in the example given above will be added to the reaction mass initially, that is to say, with the amounts of ingredients as shown in the example referred to 3,500 cc. of benzyl chloride would be added initially instead of only 1,000 cc.

If an aralkyl halide is used the azeotropic mixture of which with water has a boiling point higher than is desirable for the etherification reaction, an inert solvent, as, for example, toluene, xylene, or the like, may be added to the reaction mixture in amounts inferior to the amount of aralkyl halide employed, say 10–30% thereof. This inert solvent can be separated from the distillate and returned to the reaction mass continuously by the use of known apparatus or, if such procedure is not followed, additional amounts of the inert solvent can be added to the reaction mixture from time to time.

It will be seen that the etherification process involving the method in accordance with my invention comprises essentially the continuous removal of water from the reaction mass as an azeotropic mixture, together with repeated additions of fresh alkali solutions to the reaction mass, the alkali solutions gradually increasing in concentration from the relatively low concentration initially used in the reaction to a high final concentration.

What I claim and desire to protect by Letters Patent is:

1. The method for the preparation of high viscosity aralkyl ethers of cellulose which includes impregnating cellulose with an aqueous alkali solution and reacting the impregnated cellulose with an aralkyl halide while continuously separating water from the reaction zone by distillation therefrom as an azeotropic mixture and periodically adding to the reaction zone aqueous alkali solutions of progressively higher concentrations than that initially used to impregnate the cellulose.

2. The method for the preparation of high viscosity aralkyl ethers of cellulose which includes impregnating cellulose with an aqeous alkali solution and reacting the impregnated cellulose with an aralkyl halide while continuously separating water from the reaction zone by distillation therefrom and periodically adding to the reaction zone aqueous alkali solutions of progressively higher concentrations than that initially used to impregnate the cellulose.

3. The method for the preparation of high viscosity aralkyl ethers of cellulose which includes impregnating cellulose with an aqueous alkali solution and reacting the impregnated cellulose with an aralkyl halide while continuously separating water from the reaction zone by distillation therefrom as an azeotropic mixture with the aralkyl halide and periodically adding to the reaction zone aqueous alkali solutions of progressively higher concentrations than that initially used to impregnate the cellulose.

4. The method for the preparation of high viscosity aralkyl ethers of cellulose which includes impregnating cellulose with an aqueous alkali solution and reacting the impregnated cellulose with an aralkyl halide while continuously separating water from the reaction zone by distillation therefrom as an azeotropic mixture with the aralkyl halide, returning the condensed aralkyl halide to the reaction zone, and periodically adding to the reaction zone aqueous alkali solutions of progressively higher concentrations than that initially used to impregnate the cellulose.

5. The method for the preparation of high viscosity aralkyl ethers of cellulose which includes impregnating cellulose with an aqueous alkali solution and reacting the impregnated cellulose with an aralkyl halide in the presence of a non-reactive liquid while continuously separating water from the reaction zone by distillation therefrom as an azeotropic mixture with said non-reactive liquid and periodically adding to the reaction zone aqueous alkali solutions of progressively higher concentrations than that initially used to impregnate the cellulose.

6. The method for the preparation of high viscosity aralkyl ethers of cellulose which includes impregnating cellulose with an aqueous alkali solution and reacting the impregnated cellulose with an aralkyl halide in the presence of toluene while continuously separating water from the reaction zone by distillation therefrom as an azeotropic mixture with the toluene and periodically adding to the reaction zone aqueous alkali solutions of progressively higher concentrations than that initially used to impregnate the cellulose.

7. The method for the preparation of high viscosity aralkyl ethers of cellulose which includes impregnating cellulose with an aqueous alkali solution and reacting the impregnated cellulose with an aralkyl halide while continuously separating water from the reaction zone by distillation therefrom and periodically adding to the reaction zone aqueous alkali solutions of progressively higher concentrations than that initially used to impregnate the cellulose in amounts sufficient to restore substantially the amount of water initially present.

8. The method for the preparation of high viscosity aralkyl ethers of cellulose which includes impregnating cellulose with an aqueous alkali solution and reacting the impregnated cellulose with an aralkyl halide while continuously separating water from the reaction zone by distillation therefrom and periodically adding to the reaction zone aqueous alkali solutions of concentrations progressively increasing from about 18% to about 33%.

9. The method for the preparation of high viscosity aralkyl ethers of cellulose which includes impregnating cellulose with an aqueous alkali solution and reacting the impregnated cellulose with an aralkyl halide while continuously separating water from the reaction zone by distillation therefrom and periodically adding to the reaction zone when substantially 50% of the water present has been so removed aqueous alkali solutions of progressively higher concentrations than that initially used to impregnate the cellulose in amounts sufficient to restore substantially the amount of water initially present.

10. The method for the preparation of high viscosity aralkyl ethers of cellulose which includes impregnating cellulose with an aqueous alkali solution and reacting the impregnated cellulose with an aralkyl halide while continuously separating water from the reaction zone by distillation therefrom as an azeotropic mixture and effecting a progressive increase in the alkali concentration in the reaction mass above that initially present during the reaction.

11. The method for the preparation of high viscosity aralkyl ethers of cellulose which includes impregnating cellulose with an aqueous alkali solution and reacting the impregnated cellulose with an aralkyl halide while continuously separating water from the reaction zone by distillation therefrom as an azeotropic mixture and periodically increasing the alkali concentration in the reaction mass during the reaction so as to effect a progressive increase therein above that initially present.

12. The method for the preparation of high viscosity aralkyl ethers of cellulose which includes impregnating cellulose with an aqueous alkali solution having a concentration of about 18% to about 22% and reacting the impregnated cellulose with an aralkyl halide while separating water from the reaction zone by distillation therefrom and periodically adding to the reaction zone aqueous alkali solutions of concentrations progressively increasing by increments of about 2% to about 5% from the concentration of the solution initially used for impregnating the cellulose.

13. The method for the preparation of high viscosity aralkyl ethers of cellulose which includes impregnating cellulose with an aqueous alkali solution and reacting the impregnated cellulose with an aralkyl halide while separating water from the reaction zone by distillation therefrom and periodically adding to the reaction zone aqueous alkali solutions of concentrations progressively increasing by increments of about 2% to about 5% from the concentration of the solution initially used for impregnating the cellulose.

14. The method for the preparation of high viscosity aralkyl ethers of cellulose which includes impregnating cellulose with an aqueous alkali solution and reacting the impregnated cellulose with an aralkyl halide while continuously separating water from the reaction zone by distillation therefrom and periodically adding to the reaction zone when substantially 40%–80% of the water present has been so removed aqueous alkali solutions of progressively higher concentrations than that initially used to impregnate the cellulose.

15. The method for the preparation of high viscosity aralkyl ethers of cellulose which includes impregnating cellulose with an aqueous alkali solution and reacting the impregnated cellulose with an aralkyl halide, separating water from the reaction zone by distillation and effecting a progressive increase in the alkali concentration in the reaction mass above that initially present during the reaction.

16. The method for the preparation of high viscosity benzyl cellulose which includes impregnating cellulose with an aqueous alkali solution and reacting the impregnated cellulose with benzyl chloride, separating water from the reaction zone by distillation and effecting a progressive increase in the alkali concentration in the reaction mass above that initially present during the reaction.

17. The method for the preparation of high viscosity benzyl cellulose which includes impregnating cellulose with an aqueous alkali solution and reacting the impregnated cellulose with benzyl chloride while continuously separating water from the reaction zone by distillation therefrom as an azeotropic mixture and periodically increasing the alkali concentration in the reaction mass during the reaction so as to effect a progressive increase therein above that initially present.

18. The method for the preparation of high viscosity benzyl cellulose which includes impregnating cellulose with an aqueous alkali solution and reacting the impregnated cellulose with benzyl chloride while continuously separating water from the reaction zone by distillation therefrom and periodically adding to the reaction zone aqueous alkali solutions of progressively higher concentrations than that initially used to impregnate the cellulose.

19. The method for the preparation of high viscosity benzyl cellulose which includes impregnating cellulose with an aqueous alkali solution and reacting the impregnated cellulose with benzyl chloride in the presence of a non-reactive liquid while continuously separating water from the reaction zone by distillation therefrom as an azeotropic mixture with said non-reactive liquid and periodically adding to the reaction zone aqueous alkali solutions of progressively higher concentrations than that initially used to impregnate the cellulose.

20. The method for the preparation of high viscosity benzyl cellulose which includes impregnating cellulose with an aqueous alkali solution having a concentration of about 18% to about 22% and reacting the impregnated cellulose with benzyl chloride while separating water from the reaction zone by distillation therefrom and periodically adding to the reaction zone aqueous alkali solutions of concentrations progressively increasing by increments of about 2% to about 5% from the concentration of the solution initially used for impregnating the cellulose.

EUGENE J. LORAND.